(12) United States Patent
Bernhardt

(10) Patent No.: US 12,000,541 B2
(45) Date of Patent: Jun. 4, 2024

(54) INSTALLATION AND A METHOD FOR STORING AND DISPENSING CRYOGENIC FLUID

(71) Applicant: L'Air Liquide, Societe Anonyme pour l'Etude et l'Exploitation des Procedes Georges Claude, Paris (FR)

(72) Inventor: Jean-Marc Bernhardt, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 130 days.

(21) Appl. No.: 17/793,282

(22) PCT Filed: Dec. 11, 2020

(86) PCT No.: PCT/EP2020/085673
§ 371 (c)(1),
(2) Date: Jul. 15, 2022

(87) PCT Pub. No.: WO2021/144087
PCT Pub. Date: Jul. 22, 2021

(65) Prior Publication Data
US 2023/0349513 A1    Nov. 2, 2023

(30) Foreign Application Priority Data

Jan. 17, 2020    (FR) ...................................... 2000477

(51) Int. Cl.
*F17C 7/02*    (2006.01)
*F17C 5/02*    (2006.01)
(52) U.S. Cl.
CPC .................. *F17C 7/02* (2013.01); *F17C 5/02* (2013.01); *F17C 2221/012* (2013.01); *F17C 2223/013* (2013.01); *F17C 2223/036* (2013.01); *F17C 2227/0121* (2013.01)

(58) Field of Classification Search
CPC ........ F17C 7/02; F17C 5/02; F17C 2221/012; F17C 2223/013; F17C 2223/036; F17C 2227/0121
(Continued)

(56) References Cited

U.S. PATENT DOCUMENTS

| 5,771,946 | A | 6/1998 | Kooy et al. |
| 7,413,585 | B2 * | 8/2008 | Da Silva ................... F17C 5/06 422/106 |

(Continued)

FOREIGN PATENT DOCUMENTS

| JP | 2014111984 A | * | 6/2014 |
| KR | 2013 0 050 820 | | 5/2013 |

(Continued)

OTHER PUBLICATIONS

JP 2014111984 A—English Translation (Year: 2014).*
(Continued)

*Primary Examiner* — Timothy P. Kelly
*Assistant Examiner* — Christopher M Afful
(74) *Attorney, Agent, or Firm* — Justin K. Murray

(57) ABSTRACT

Plant and method for storing and distributing pressurized liquefied cryogenic fluid, comprising a liquefied gas source and a distribution member, comprising a first fluid inlet connected to the liquefied gas source and a second end intended to be connected to a user of the pressurized liquefied gas supplied by the distribution member, the source comprising a first liquefied gas store configured to store and supply the liquefied gas to the distribution member at a first determined pressure, the source comprising a second liquefied gas store configured to store the liquefied gas at a second determined pressure which is lower than the first pressure, the plant comprising a connecting pipe having a valve assembly connecting the first and second liquefied gas (Continued)

stores, the plant comprising a filling pipe having a valve assembly and having a first end connected to the second liquefied gas store and a second end intended to be connected to a mobile store for supplying liquefied gas to fill the source.

17 Claims, 5 Drawing Sheets

(58) Field of Classification Search
USPC .......................................................... 141/82
See application file for complete search history.

(56) References Cited

U.S. PATENT DOCUMENTS

| 2018/0016130 A1 | 1/2018 | Watts et al. |
| 2020/0255099 A1* | 8/2020 | Lee ........................ B63B 27/34 |
| 2020/0370709 A1 | 11/2020 | Guedacha et al. |

FOREIGN PATENT DOCUMENTS

| WO | WO 2015/114283 | 8/2015 |
| WO | WO 2019/102155 | 5/2019 |

OTHER PUBLICATIONS

International Search Report and Written Report for PCT/EP2020/085673, dated Mar. 2, 2021.
French Search Report and Written Opinion for FR 2 000 477, dated Sep. 25, 2020.

* cited by examiner

[Fig. 1]
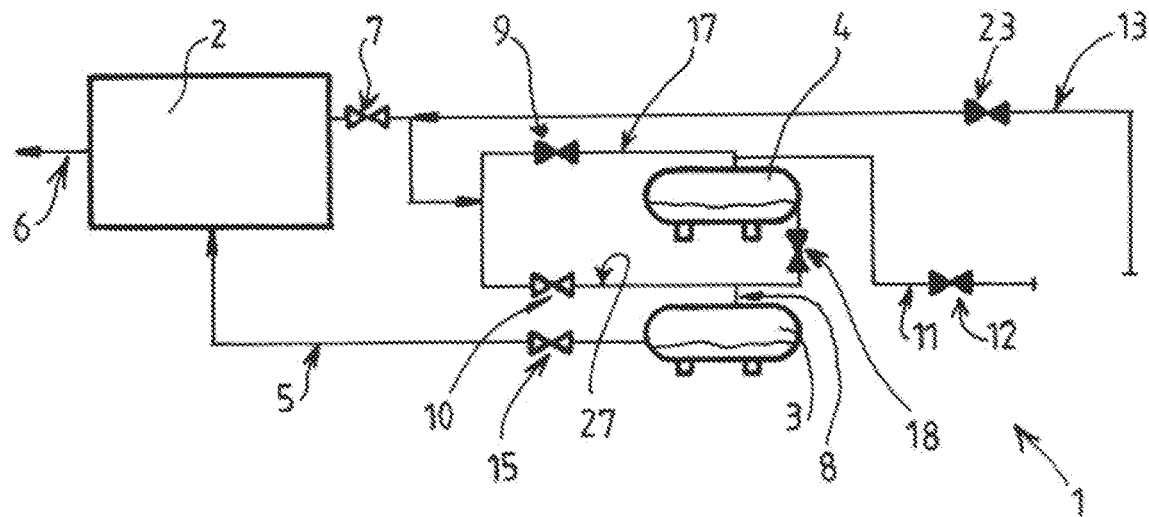
[Fig. 2]
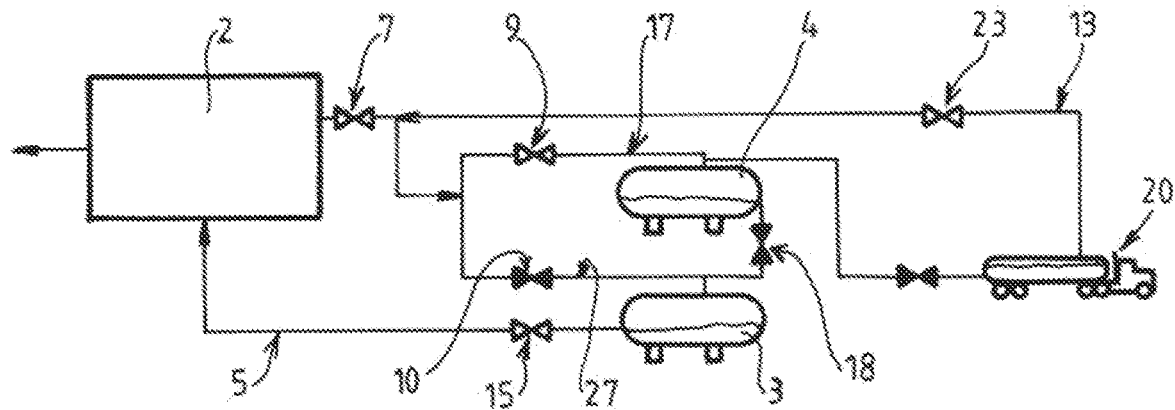

[Fig. 3]
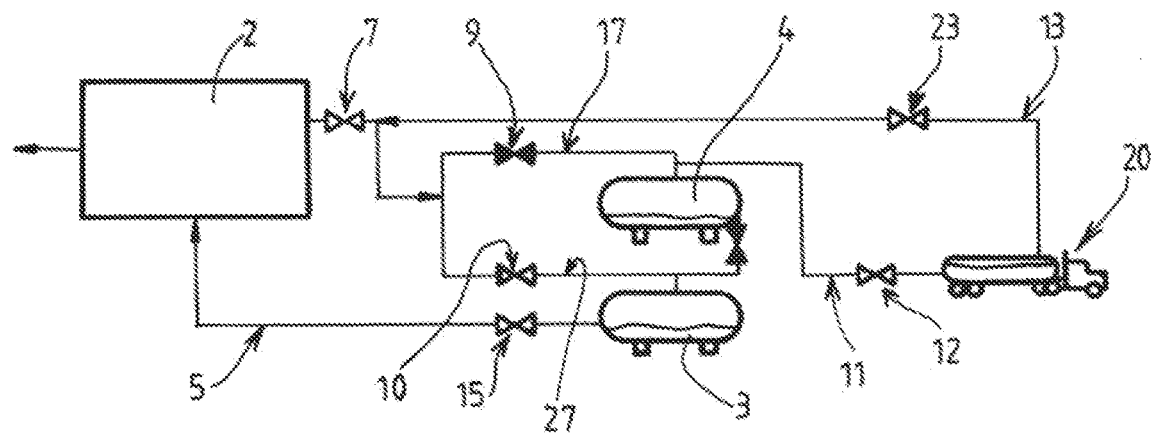
[Fig. 4]
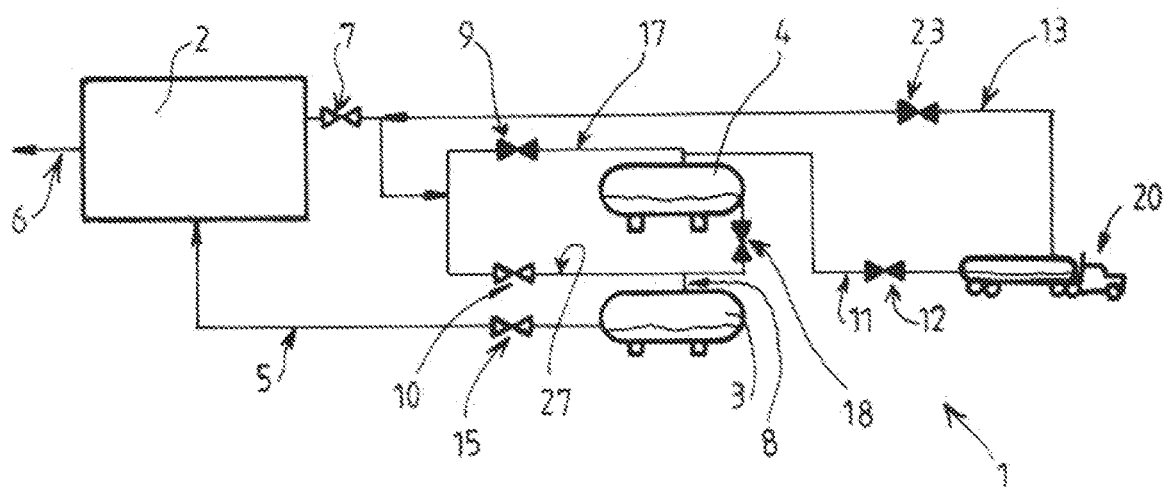

[Fig. 5]
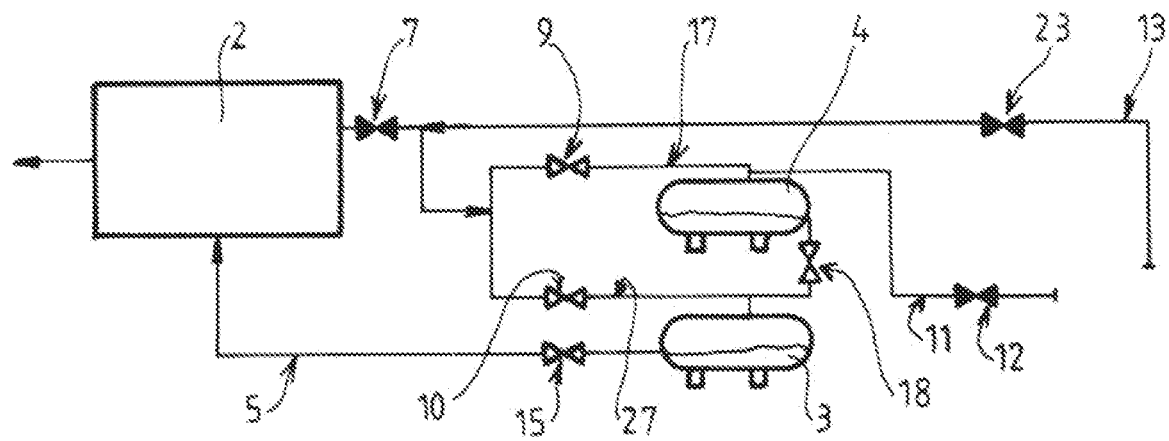
[Fig. 6]
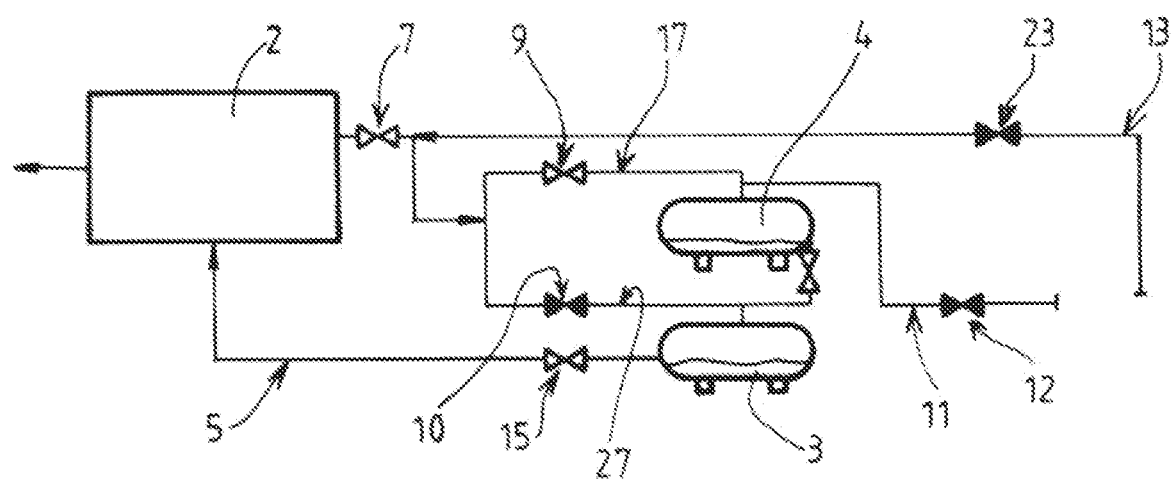

[Fig. 7]
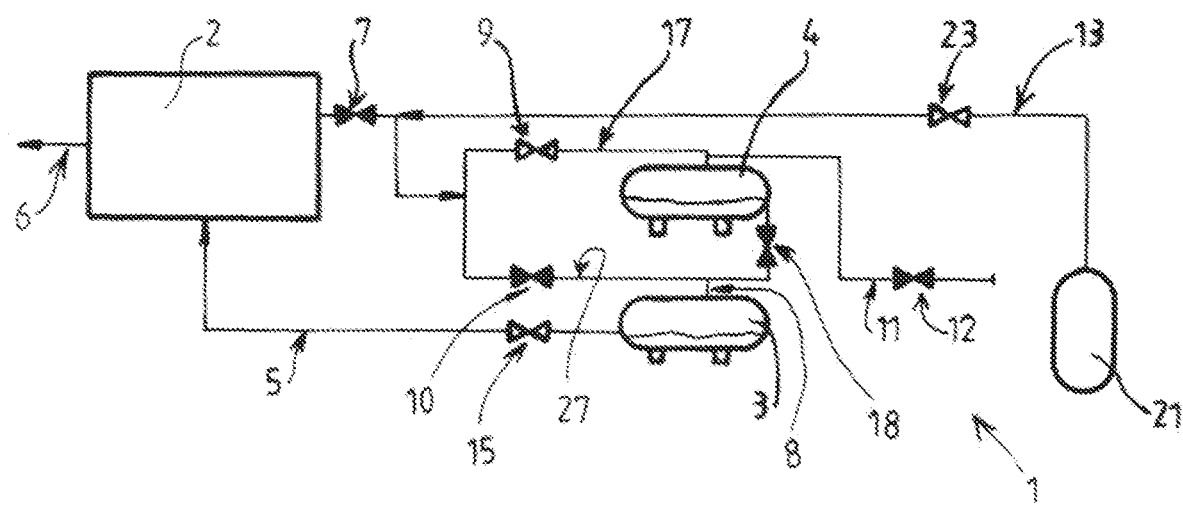
[Fig. 8]
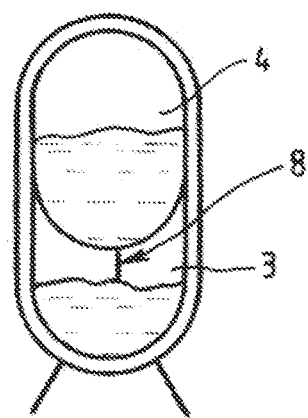

[Fig. 9]
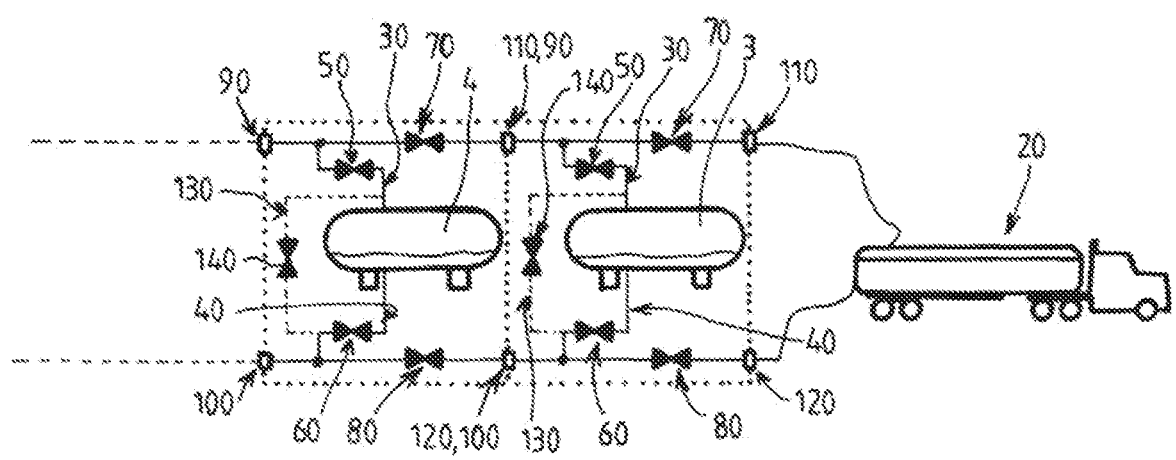

INSTALLATION AND A METHOD FOR STORING AND DISPENSING CRYOGENIC FLUID

CROSS-REFERENCE TO RELATED APPLICATIONS

This application is a § 371 of International PCT Application PCT/EP2020/085673, filed Dec. 11, 2020, which claims § 119(a) foreign priority to French patent application FR 2000477, filed Jan. 17, 2020.

BACKGROUND

Field of the Invention

The invention relates to an installation and to a method for storing and dispensing cryogenic fluid.

The invention relates more particularly to an installation for storing and dispensing pressurized liquefied cryogenic fluid, in particular liquefied hydrogen, the installation comprising a liquefied gas source and a dispenser, the dispenser comprising a first fluid inlet connected to the liquefied gas source via a set of pipes and a second end intended to be attached to a user of the pressurized liquefied gas supplied by the dispenser, the source comprising a first liquefied gas store configured to store liquefied gas and supply it to the dispenser at the first determined pressure.

Related Art

Due to its greater density, hydrogen in the liquid state is preferred to hydrogen in the gaseous state when large amounts of product have to be transported over great distances.

On the other hand, the low density of the liquid in comparison with water, for example, limits the pressure available by hydrostatic height. Thus, the low temperature of the liquid hydrogen can result in fairly high losses by evaporation during transfers.

Truck unloading systems and tanks at hydrogen supply stations can thus result in losses that may be up to 15% of production. These truck pressurization losses can of course be wasted at each station or recovered, reheated, recompressed and reinjected into a liquefier (however, this requires an investment in a loss recirculation system and an oversizing of the liquefaction system).

In general, the trucks transporting mobile stores from the liquefier must be pressurized in order to discharge the liquid hydrogen from the truck to the fixed store of the station. This fixed store is kept pressurized in order to ensure the operation of the liquid pump that it supplies (or for the supply of pressurized hydrogen to a user).

The pressurization of the mobile store is generally realized by evaporation and heating of hydrogen from the truck (pressure buildup unit "PBU") which is reinjected into the tank. This therefore introduces energy into the truck.

Once the amount of liquid has been transferred to the fixed station, the delivery truck can go on to supply another station or return to the liquefier for resupply. The movement of the truck will allow a pressure reduction by virtue of the movement of the liquid in the store and its contact with the vapor phase. On the other hand, the resulting pressure will always be greater than the initial pressure on account of the addition of energy in the system.

Ultimately, the number of fillings carried out by the truck and the necessary pressure for these stations will determine the amount of hydrogen wasted or to be reliquefied in the liquefier after the round trip.

SUMMARY OF THE INVENTION

One aim of the present invention is to overcome all or some of the drawbacks of the prior art set out above.

To that end, the installation according to the invention, which is moreover in accordance with the generic definition thereof given in the preamble above, is essentially characterized in that the source comprises a second liquefied gas store configured to store liquefied gas at a second determined pressure which is lower than the first determined pressure of the first liquefied gas store, the installation comprising a connecting pipe provided with a set of valve(s) connecting the first and second liquefied gas stores so as to allow a transfer of fluid between the two liquefied gas stores, the installation comprising a filling pipe provided with a set of valve(s) and 3o having a first end connected to the second liquefied gas store (3) and a second end intended to be connected to a mobile store for supplying liquefied gas so as to fill the source.

Moreover, embodiments of the invention may have one or more of the following features:
- the dispenser comprises a second fluid inlet attached to the upper parts of the first and second liquefied gas stores via respective vapor transfer pipes, said vapor transfer pipes being provided with a set of valve(s), said vapor transfer pipes being configured to allow the transfer of pressurized fluid, in particular vapor, between the dispenser and the first and/or the second liquefied gas store,
- the installation comprises a vapor collection pipe provided with a set of valve(s) and comprising a first end attached to the second fluid inlet of the dispenser and a second end intended to be attached to an upper end of a mobile store for supplying liquefied gas so as to transfer vapors from a mobile store to the dispenser (2),
- the two liquefied gas stores are arranged relatively so as to allow liquefied fluid to be transferred from the second store to the first store by gravity,
- the second liquefied gas store is located above the first store,
- the first liquefied gas store and the second liquefied gas store are accommodated in one and the same tank comprising two superimposed compartments with a common base and in which the second store is formed by the upper compartment and the first store is formed by the lower compartment,
- the dispenser comprising a cryogenic fluid pumping mechanism configured to pump liquefied gas from liquefied gas at a first determined pressure,
- the first liquefied gas store and the second liquefied gas store (4) each form part of a respective basic container each comprising a first fluid transfer pipe having a first end attached to an upper end of the store, a second fluid transfer pipe having a first end attached to a lower end of the store, the first and the second transfer pipe each comprising a set of respective valve(s), the first transfer pipe comprising two branches forming two second ends attached in parallel to the first end of the first transfer pipe, the two second ends of the first transfer pipe each being provided with a respective fluidic connection fitting, the second transfer pipe comprising two branches forming two second ends attached in parallel to the first end of the second transfer pipe, the two second ends of the second transfer pipe each being provided with a respective fluidic connection fitting, a third connecting pipe having a first end attached to the first transfer pipe and a second end attached to the second transfer pipe, said third connecting pipe comprising a set of valve(s), the basic containers (1) being fluidically attached to one another, at least one of the basic containers comprises a third connecting pipe having a first end attached to the upper end of the tank, for example via the first transfer pipe, and a second end attached to the lower end of the tank, for example via the second transfer pipe, said third connecting pipe comprising a set of valve(s), the first end of the third connecting pipe being able to be connected to the first end of the first transfer pipe, the second end of the third connecting pipe being able to be connected to the first end of the second transfer pipe.

The invention also relates to a method for storing and dispensing pressurized liquefied cryogenic fluid, in particular liquefied hydrogen, by means of an installation in accordance with any one of the features above or below, the method comprising filling the second cryogenic fluid store with liquefied cryogenic fluid from a mobile supply store via the filling pipe.

According to other possible distinctive features:
- the method comprises, prior to the filling of the second cryogenic fluid store, a step of building up the pressure within the mobile supply store, the second cryogenic fluid store being filled from the mobile store by placing the mobile supply store and the second fluid store in fluidic communication with a pressure difference,
- the method comprises a step of transferring liquefied fluid from the second liquefied gas store to the first liquefied gas store by placing the latter in fluidic communication with a pressure difference,
- the method comprises, prior to the step of transferring liquefied fluid from the second liquefied gas store to the first liquefied gas store, a step of equalizing pressure between the first liquefied gas store and the second liquefied gas store,
- the method comprises, after the step of equalizing pressure between the first liquefied gas store and the second liquefied gas store, a step of reducing the pressure in the second liquefied gas store,
- the step of reducing the pressure in the second liquefied gas store comprises at least one from among: a pressure equalization between the second liquefied gas store and a fixed or mobile store, a transfer of pressurized gas from the second gas store to a gas user, such as a fuel cell,
- the method comprises a step of transferring liquefied cryogenic fluid at the first pressure from the first liquefied gas store to the dispenser,
- the method comprises, at the same time as or after the step of transferring liquefied cryogenic fluid at the first pressure from the first liquefied gas store to the dispenser, a step of transferring pressurized vapor from the dispenser (2) to the first gas store.

The invention may also relate to any alternative device or method comprising any combination of the features above or below within the scope of the claims.

BRIEF DESCRIPTION OF THE FIGURES

Other features and advantages will become apparent from reading the following description, which is given with reference to the figures, in which:

FIG. 1 shows a schematic and partial view illustrating the structure and the operation of an installation in accordance with one exemplary embodiment of the invention in a first operating configuration, FIG. 2 shows a schematic and partial view illustrating the structure and the operation of an installation in accordance with one exemplary embodiment of the invention in a second operating configuration, FIG. 3 shows a schematic and partial view illustrating the structure and the operation of an installation in accordance with one exemplary embodiment of the invention in a third operating configuration, FIG. 4 shows a schematic and partial view illustrating the structure and the operation of an installation in accordance with one exemplary embodiment of the invention in a fourth operating configuration, FIG. 5 shows a schematic and partial view illustrating the structure and the operation of an installation in accordance with one exemplary embodiment of the invention in a fifth operating configuration, FIG. 6 shows a schematic and partial view illustrating the structure and the operation of an installation in accordance with one exemplary embodiment of the invention in a sixth operating configuration, FIG. 7 shows a schematic and partial view illustrating the structure and the operation of an installation in accordance with one exemplary embodiment of the invention in a seventh operating configuration, FIG. 8 shows a schematic and partial view illustrating a detail of a possible variant embodiment of the source of the installation according to the invention, FIG. 9 shows a schematic and partial view illustrating the structure and the operation of an installation in accordance with another exemplary embodiment of the invention.

DETAILED DESCRIPTION OF THE INVENTION

The schematically shown installation 1 for storing and dispensing pressurized liquefied cryogenic fluid, in particular for liquefied hydrogen, comprises a liquefied gas source 3, 4 and a dispenser 2. The dispenser 2 comprises a first fluid inlet connected to the liquefied gas source 3, 4 via a set of pipes and a second end intended to be attached to at least one user of the pressurized liquefied gas supplied by the dispenser 2. The dispenser 2 comprises for example a cryogenic fluid pumping mechanism, such as a pump, configured to pump liquefied gas in the source (at a first determined pressure) so as to transfer this pressurized fluid to a user (for example to supply fluid at high pressure to a vehicle tank to be filled, for example between 200 and 1000 bar, in particular between 200 and 800 bar). The dispenser 2 may also have a system for evaporating (heating) the pumped cryogenic liquid.

The source comprises at least one first liquefied gas store 3 configured to store and supply liquefied gas to the dispenser 2 at the first determined pressure. That is to say that the first store 3 is connected to a first inlet of the pumping member of the dispenser 2 so as to supply it with cryogenic liquid under determined thermodynamic conditions, in particular pressure conditions. For example, the first store 3 is connected to the first inlet of the dispenser (and pumping member) 2 via a pipe 5 provided with a set of valve(s) 15.

The source comprises at least one second liquefied gas store 4 configured to store liquefied gas under second thermodynamic conditions and in particular at a second determined pressure which is generally lower than the first determined pressure of the first liquefied gas store 3.

Lastly, the installation 1 comprises a connecting pipe 8 provided with a set of valve(s) 18 connecting the first liquefied gas store 3 and second liquefied gas store 4 so as to allow fluid to be transferred between the two liquefied gas stores 3, 4. In addition, the installation 1 comprises a filling pipe 11 provided with a set of valve(s) 12 and having a first end connected to the second liquefied gas store 4 and a second end intended to be connected to a mobile store 20 for supplying liquefied gas so as to fill the source.

This source architecture with two liquefied gas stores 3, 4 (or two sets of liquefied gas stores) having separate respective store pressures makes it possible to limit the buildup of pressure in the mobile stores 20 while the source is being filled. This is because the second store 4 can be configured to not supply the dispenser 2 directly. In this way, this second liquefied gas store 4 can be configured to store the liquefied gas at a second pressure (for example between 1 bar and 8 bar and in particular between 1.5 bar and 6 bar and for example 2 bar) lower than the first pressure (for example between 1 bar and 12 bar, in particular between 2 bar and 8 bar, for example 6 bar) necessary for proper operation of the dispenser 2. For example, the second pressure may be lower than the first pressure by a value of between 0.5 and 10 bar.

This makes it possible to limit the pressure of the mobile delivery store 20 which has to supply the installation 1 since the mobile store 20 must adapt to the relatively lower second determined pressure. This makes it possible to limit the gaseous product losses when filling the sources because the mobile store 20 can be kept at a relatively lower pressure when it is being transported (for example one bar above the pressure in the second liquefied gas store 4) and requires fewer pressurization step(s) (injection of heat).

The second liquefied gas store 4 (relatively lower pressure) can be transferred to the first liquefied gas store 3 (relatively higher pressure) after being supplied by the mobile store 20 and in a slower process.

The two liquefied gas stores 3, 4 are preferably arranged relatively so as to allow liquefied fluid to be transferred from the second store 4 to the first store 3 by gravity. For example, the second liquefied gas store 4 is located above the first store 3. According to a possible embodiment illustrated in FIG. 7, the first liquefied gas store 3 and the second liquefied gas store 4 may even be accommodated in one and the same tank comprising two superimposed compartments with a common base and in which the second store 4 is formed by the upper compartment and the first store 3 is formed by the lower compartment.

In addition, the capacities (storage volumes) of the first liquefied gas store 3 and second liquefied gas store 4 may be different. This makes it possible to optimize the capacities depending on their uses.

As illustrated, the dispenser 2 preferably comprises a second fluid inlet attached to the upper parts of the first liquefied gas store 3 and second liquefied gas store 4 via vapor transfer pipes 17, 27 provided with a set of valve(s) 7, 9, 10.

For example, the upper parts of the first liquefied gas store 3 and second liquefied gas store 4 are connected to the second inlet of the dispenser 2 via two vapor transfer pipes 17, 27, respectively, arranged in parallel and each provided with a valve 9, 10. In addition, a common valve 7 may be provided in a shared portion of the two transfer pipes 17, 27 that is attached to the second inlet. These vapor transfer pipes 17, 27 are configured to allow the transfer of pressurized fluid, in particular vapor, between the dispenser 2 and the first liquefied gas store 3 and/or the second liquefied gas store 4 (preferably in both directions).

The installation 1 preferably also comprises a vapor collection pipe 13 provided with a set of valve(s) 23 and comprising a first end attached to the second fluid inlet of the dispenser 2 and a second end intended to be attached to an upper end of a mobile store 20 for supplying liquefied gas. This vapor collection pipe 13 makes it possible to transfer vapors from a mobile store 20 to the dispenser 2 or the stores 3, 4 (and vice versa).

The figures describe various possible use configurations (storage, dispensing and supply). The valves are shown in black or in white depending on whether they are closed or open, respectively.

In the configuration of FIG. 1, the first liquefied gas store 3 can supply the dispenser 2 with liquefied gas at the first pressure (valves 15 open). Any vapors produced in the dispenser 2 (pumping vaporization gas for example, vaporization gas from a pump, or any other "boil-off" vaporization gas) can be returned to the first liquefied gas store 3 (via the vapor transfer pipe 27 with the corresponding valves 7, 10 open).

In the configuration of FIG. 2, a mobile store 20 for supplying liquefied gas fills the second liquefied gas store 4. The second end of the filling pipe 11 is connected to a mobile store 20 for supplying liquefied gas. In addition, the second end of the vapor collection pipe 13 is attached to the upper end of the mobile store 20 for supplying liquefied gas (preferably via the common valve 7 of the vapor transfer pipes 17, 27).

In a first phase, the pressure between the mobile supply store 20 and the second liquefied gas store 4 can be equalized via for example opening the valves 23 and 9 of the corresponding vapor collection pipes 13 and vapor transfer pipes 17.

To transfer liquid by pressure difference between the mobile store 20 and the second liquefied gas store 4 (without pumping), the pressure in the mobile supply store 20 must be higher than the pressure in the second liquefied gas store 4. Or, failing that, the mobile store 20 must be equipped with a pump.

The pressure in the mobile store 20 can be built up if necessary by self-pressurization (conventionally by withdrawing, heating and reinjecting fluid in the mobile store 20).

This pressure can also be built up by transferring pressurized fluid supplied by the dispenser 2 (via the gas collection pipe 13 and opening the valves 23, 7 in question) or by the first store 3 instead of the second store 4 (via the pipes 13, 27 and opening the valves 10 and closing the valves 9 in question). As illustrated in FIG. 3, gas under vaporization pressure generated in the dispenser 2 can be transferred at the same time or sequentially into the first liquefied gas store 3 via the vapor transfer pipe 27 (opening the corresponding valves 7 and 10).

When the pressure in the mobile store 20 is greater than the pressure in the second gas store 4, liquefied gas can be transferred from the mobile store 20 to the second liquefied gas store 4 by pressure difference, by opening the valve 12 of the filling pipe 11. This is shown in FIG. 3. As illustrated, the second liquefied gas store 4 is preferably filled by way of its upper part.

As above, gas under vaporization pressure generated in the dispenser 2 can be transferred at the same time or sequentially into the first liquefied gas store 3 via the vapor transfer pipe 27 (opening the corresponding valves 7 and 10). Similarly, gas under vaporization pressure generated in the dispenser 2 can be transferred at the same time or sequentially into the mobile store 20 via the vapor collection pipe 13 and opening the valves 7, 23 in question.

When the second liquefied gas store 4 is filled, the mobile supply store 20 can be disconnected after closing the valves 12, 23 of the vapor collection pipe 13 and of the filling pipe 11, as is illustrated in FIG. 4.

If the pressure in the first liquefied gas store 3 is not low enough to receive liquid liquefied gas from the second liquefied gas store 4, it may be necessary to pressurize the second liquefied gas store 4 to the pressure in the first liquefied gas store 3 (or above the pressure in the first liquefied gas store 3).

As illustrated in FIG. 5, in a first step, provision may be made for a pressure equalization between the first liquefied gas store 3 and second liquefied gas store 4.

This can be realized by opening the valves 9, 10 of the vapor transfer pipes 17, 27 connecting the upper parts of said two stores 3, 4.

If the second liquefied gas store 4 is positioned at a higher altitude than the first liquefied gas store 3, liquid liquefied gas can be transferred from the second liquefied gas store 4 to the first liquefied gas store 3 by gravity.

Otherwise (or in addition), the second liquefied gas store 4 can be pressurized to a pressure greater than the pressure in the first liquefied gas store 3. This can be realized by closing the valve 9 in the vapor transfer pipe 17 connected to the second liquefied gas store 4 and by building up the pressure in the latter. For example, this buildup of pressure may be realized by any known means (via an evaporator and/or a heater).

FIG. 6 describes an example of filling the first liquefied gas store 3 with liquefied gas from the second liquefied gas store 4. The valve 18 of the connecting pipe 8 is open. In the case of supply from the top: the liquefied gas enters the first liquefied gas store 3 from the top and there cools the vapors present in the upper part. This lowers the pressure in the first liquefied gas store 3. This pressure drop accelerates the transfer of liquid (pressure difference).

This transfer of liquid can be carried out for as long as necessary depending on the relative volumes and architectures of the two liquefied gas stores 3, 4.

When the second liquefied gas store 4 is emptied, this valve 18 of the connecting pipe 8 is closed. The first liquefied gas store 3 and second liquefied gas store 4 are at an identical pressure again via opening the valve 10 of the vapor transfer pipe 27 connected to the first liquefied gas store 3.

Then, as illustrated in FIG. 7, to make the next filling of the second liquefied gas store 4 possible, the pressure in the latter can be lowered to a low pressure compatible with the pressure of the mobile supply store 20 again.

This pressure drop can be achieved by transferring pressurized gas to a fixed store 21 or mobile store 20 by pressure equalization. This makes it possible, if necessary, to advantageously build up the pressure in such a mobile supply store 20 which would require it (opening the valves 9 and 23 of the vapor transfer pipes 17 and vapor collection pipes 13). This makes it possible, if necessary, to replace a self-pressurizing system of a mobile supply store 20.

As illustrated in FIG. 9, at least one of the liquefied gas stores 3, 4 of the liquefied gas source may be composed of a tank of a modular basic container. Said container is provided with a first fluid transfer pipe 30 having a first end attached to an upper end of the tank 3, 4. The tank 3, 4 is provided with a second fluid transfer pipe 40 having a first end attached to a lower end of the tank 3, 4. The first transfer pipe 30 and the second transfer pipe 40 each comprise a set of respective valve(s). The first transfer pipe 30 comprises two branches forming two second ends attached in parallel to the first end of the first transfer pipe 30, the two second ends of the first transfer pipe 30 each being provided with a respective fluidic connection fitting 90, 110. The second transfer pipe 40 comprises two branches forming two second ends attached in parallel to the first end of the second transfer pipe 40, the two second ends of the second transfer pipe 40 each being provided with a respective fluidic connection fitting 100, 120. The fluidic connection fittings 90, 100, 110, 120 located at the second ends of the transfer pipes are preferably fittings of the quick-connection type.

The first transfer pipe 30 comprises for example a first valve 50 located close to its first end and a second valve 70 located at one of the two second ends. The second transfer pipe 40 comprises for example in the same way a first valve 60 located close to its first end and a second valve 80 located at one of the two second ends.

Each basic container may comprise a third connecting pipe 130 having a first end attached to the upper end of the tank, for example via the first transfer pipe 30, and a second end attached to the lower end of the tank, for example via the second transfer pipe 40, said third connecting pipe 130 comprising a set of valve(s) 140. The first end of the third connecting pipe 130 is connected to the first end of the first transfer pipe 30. The second end of the third connecting pipe 13 is connected to the first end of the 1s second transfer pipe 40.

The two basic containers are connected and thus make it possible to attach the two corresponding stores 3, 4 in series or in parallel.

In this example, a first basic container (on the right) is attached in series to a second container (on the left). A second end 110 of the first transfer pipe 30 of the second store 4 is attached to a second end 90 of the first transfer pipe 30 of the first store 3. A second end 120 of the second transfer pipe 40 of the second store 4 is attached to a second end 100 of the second transfer pipe 40 of the first store 3.

The two stores 3, 4 of the basic containers can thus be attached in series and/or in parallel to a source and/or a receiver attached to the free ends 90, 100 (on the left) of the second store 4.

The second ends 110 and 120 of the first transfer pipe 30 and second transfer pipe 40 of the first store 3 (on the right) can be connected to the upper and the lower end, respectively, of a mobile supply tank 20 for liquefied gas.

In the configuration of FIG. 9, the pressure can be equalized between the upper part of the mobile tank 20 and the upper part of the first store 3 (via the first pipe 30 and opening the valves 70, 50 in question of the first store 3 and closing the other valves 80, 140, 50).

Liquid can be transferred from the mobile tank 20 to the first store 3 (from the top) by connecting the lower end of the mobile tank 20 solely to the upper part of the first store 3 (for example via the pipes 40 and 130 in question and via opening the appropriate valves 80, 60, 140). At the same time, the upper part of the mobile tank 20 can be placed in fluidic connection solely with the upper part of the second store 4 (via the pipes 30 in question and via opening the appropriate valves 70, 50).

To disconnect the mobile store from the first store, all the valves 70, 50, 60, 80, 140 of the first store can be closed.

This architecture also makes it possible to transfer gas from a user to the upper end of the one or two stores 3, 4 via the pipes 30 (gas source attached to the end 90 on the left) with the valves in question being open. At the same time, the lower parts of the stores 3, 4 can be isolated or not isolated from the end 100 so as to supply or not supply liquid to a user (attached to the end 100 on the left), the valves 140 being closed.

One or the two stores 3, 4 can supply liquid via the pipes 40 in question at the end 100 (on the left) via opening the appropriate valves 60, 80 while the upper ends of the stores 3, 4 can be isolated (appropriate valves 50, 70 are closed).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context dearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An installation for storing and dispensing pressurized liquefied cryogenic fluid, comprising:
    a dispenser comprising first and second fluid inlets and an end intended to be attached to a user of the pressurized liquefied gas supplied therefrom;
    a liquefied gas source connected to the first fluid inlet via a set of pipes and comprising a first liquefied gas store configured to store and supply liquefied gas to the dispenser at a first determined pressure and a second liquefied gas store configured to store liquefied gas at a second determined pressure which is lower than the first determined pressure;
    a connecting pipe provided with a set of valves connecting the first liquefied gas store and second liquefied gas store so as to allow fluid to be transferred therebetween; and
    a first filling pipe provided with a set of valve(s) and having a first end connected to the second liquefied gas store and a second end intended to be connected to a mobile store for supplying liquefied gas so as to fill the liquefied gas source with liquefied gas, wherein the second fluid inlet is attached to upper parts of the first and second liquefied gas stores via vapor transfer pipes, said vapor transfer pipes being provided with a set of valves and are configured to allow a transfer of pressurized vapor, between the dispenser and the first liquefied gas store and/or the second liquefied gas store.

2. The installation of claim 1, further comprising a vapor collection pipe provided with a set of valves and comprising a first end attached to the second fluid inlet and a second end intended to be attached to an upper end of the mobile store so as to transfer vapors from the mobile store to the dispenser.

3. The installation of claim 1, wherein the first and second liquefied gas stores are arranged with respect to one another so as to allow liquefied fluid to be transferred from the second liquefied gas store to the first liquefied store by gravity.

4. The installation of claim 1, wherein the second liquefied gas store is located above the first store.

5. The installation of claim 1, wherein the first liquefied gas store and the second liquefied gas store are accommodated in a same tank that comprises two superimposed compartments with a common base and the second store is formed by the upper compartment and the first store is formed by the lower compartment.

6. The installation of claim 1, wherein the dispenser comprises a cryogenic fluid pumping mechanism configured to pump liquefied gas from liquefied gas at the first determined pressure.

7. The installation of claim 1, further comprising second and third connecting pipes, wherein:
    the first liquefied gas store and the second liquefied gas store each form part of a respective basic container, the first and second liquefied gas stores being fluidically attached to one another;
    the vapor transfer pipes comprises a first and second vapor transfer pipes;
    the first vapor transfer pipe comprises a set of valves and a first end that is connected in parallel, via two branches, to two second ends each of which is provided with a respective fluidic connection fitting;
    the second vapor transfer pipe comprises a set of valves and a first end that is connected in parallel, via two branches, to two second ends each of which is provided with a respective fluidic connection fitting;
    the set of pipes comprises first and second liquid transfer pipes;
    the first liquid transfer pipe comprises a set of valves and a first end that is connected in parallel, via two branches, to two second ends each of which is provided with a respective fluidic connection fitting;
    the second liquid transfer pipe comprises a set of valves and a first end that is connected in parallel, via two branches, to two second ends each of which is provided with a respective fluidic connection fitting;
    the upper end of the first liquefied gas store is attached to the first vapor transfer pipe;

a lower end of the first liquefied gas store is attached to the first liquid transfer pipe;

the upper end of the second liquefied gas store is attached to the second vapor transfer pipe;

a lower end of the second liquefied gas store is attached to the second liquid transfer pipe;

each of the second and third connecting pipes comprises a set of valves;

the second connecting pipe has a first end attached to the first vapor transfer pipe and a second end attached to the first liquid transfer pipe; and the third connecting pipe has a first end attached to the second vapor transfer pipe and a second end attached to the second liquid transfer pipe.

8. The installation of claim 1, wherein the pressurized liquefied cryogenic fluid is pressurized liquefied hydrogen.

9. A method for storing and dispensing pressurized liquefied cryogenic fluid, comprising the steps of:
providing the installation of claim 1; and
filling the second cryogenic fluid store with liquefied cryogenic fluid from a mobile supply store via the first filling pipe.

10. The method of claim 9, further comprising, prior to the filling of the second cryogenic fluid store, a step of building up a pressure within the mobile supply store, wherein said step of filling includes placing the mobile supply store and the second fluid store in fluidic communication with a pressure difference.

11. The method of claim 9, further comprising a step of transferring liquefied fluid from the second liquefied gas store to the first liquefied gas store by placing the first and second liquefied gas stores in fluidic communication with a pressure difference therebetween.

12. The method of claim 11, further comprising, prior to said step of transferring liquefied fluid from the second liquefied gas store to the first liquefied gas store, a step of equalizing pressure between the first liquefied gas store and the second liquefied gas store.

13. The method of claim 12, further comprising, after said step of equalizing pressure between the first liquefied gas store and the second liquefied gas store, a step of reducing a pressure in the second liquefied gas store.

14. The method of claim 13, wherein said step of reducing a pressure in the second liquefied gas store comprises: pressure equalization between the second liquefied gas store and a mobile or fixed store and/or transferring pressurized gas from the second liquefied gas store to a fuel cell.

15. The method of claim 9, further comprising a step of transferring liquefied cryogenic fluid, at the first pressure, from the first liquefied gas store to the dispenser.

16. The method of claim 9, further comprising, at the same time as, or after, said step of transferring liquefied cryogenic fluid at the first pressure from the first liquefied gas store to the dispenser, a step of transferring pressurized vapor from the dispenser to the first gas store.

17. The method of claim 9, wherein the pressurized liquefied cryogenic fluid is pressurized liquefied hydrogen.

* * * * *